(12) United States Patent
Mahgerefteh et al.

(10) Patent No.: US 7,406,267 B2
(45) Date of Patent: Jul. 29, 2008

(54) METHOD AND APPARATUS FOR TRANSMITTING A SIGNAL USING THERMAL CHIRP MANAGEMENT OF A DIRECTLY MODULATED TRANSMITTER

(75) Inventors: Daniel Mahgerefteh, Los Angeles, CA (US); Roeland Nuyts, Utrecht (NL); Yasuhiro Matsui, Lawrence, MA (US); Parviz Tayebati, Weston, MA (US); Bart Johnson, North Andover, MA (US); Duncan Walker, Somerville, MA (US); Xueyan Zheng, Culver City, CA (US)

(73) Assignee: Finisar Corporation, Sunnyvale, CA (US)

( * ) Notice: Subject to any disclaimer, the term of this patent is extended or adjusted under 35 U.S.C. 154(b) by 537 days.

(21) Appl. No.: 10/933,081

(22) Filed: Sep. 2, 2004

(65) Prior Publication Data
US 2005/0111852 A1    May 26, 2005

Related U.S. Application Data

(63) Continuation-in-part of application No. 10/289,944, filed on Nov. 6, 2002, now Pat. No. 6,963,685.

(60) Provisional application No. 60/557,538, filed on Mar. 30, 2004, provisional application No. 60/530,479, filed on Dec. 17, 2003, provisional application No. 60/500,540, filed on Sep. 5, 2003.

(51) Int. Cl.
*H04B 10/04* (2006.01)
(52) U.S. Cl. .................... 398/201; 398/185; 398/186; 398/187
(58) Field of Classification Search ......... 398/185–187, 398/201
See application file for complete search history.

(56) References Cited

U.S. PATENT DOCUMENTS

| 4,561,119 A | 12/1985 | Epworth |
| 4,805,235 A | 2/1989 | Henmi |
| 5,416,629 A | 5/1995 | Huber |
| 5,920,416 A | 7/1999 | Beylat et al. |

(Continued)

FOREIGN PATENT DOCUMENTS

GB    2107147 A    4/1983

OTHER PUBLICATIONS

Chang-Hee Lee et al, Transmission of Directly Modulated 2.5-Gb/s Signals Over 250-km of Nondispersion-Shifted Fiber by Using a Spectral Filtering Method, IEEE Photonics Technology Letters, vol. 8, No. 12, Dec. 1996, pp. 1725-1727.

(Continued)

*Primary Examiner*—Leslie Pascal
(74) *Attorney, Agent, or Firm*—Workman Nydegger

(57) ABSTRACT

A fiber optic transmitter comprising a digital driver adapted to adjust the crossing point of a digital base signal, an optical source adapted to receive the digital base signal and produce a frequency modulated optical signal, and an optical spectrum reshaper adapted to convert the frequency modulated optical signal to an amplitude modulated optical signal.

A method for transmitting a signal, comprising:
 adjusting the crossing point of a digital base signal;
 providing the adjusted signal to an optical source to produce a frequency modulated optical signal; and
 providing the frequency modulated optical signal to an optical spectrum reshaper to convert the frequency modulated optical signal to an amplitude modulated optical signal.

47 Claims, 18 Drawing Sheets

Schematic of the transmitter, which consists of a driver with duty cycle control, a directly modulated semiconductor laser, and an OSR.

U.S. PATENT DOCUMENTS

| | | | |
|---|---|---|---|
| 6,104,851 | A | 8/2000 | Mahgerefteh |
| 6,115,403 | A | 9/2000 | Brenner et al. |
| 6,331,991 | B1 * | 12/2001 | Mahgerefteh ................ 372/33 |
| 6,563,623 | B1 | 5/2003 | Pennickx et al. |
| 6,778,307 | B2 * | 8/2004 | Clark ......................... 359/237 |
| 2004/0008937 | A1 * | 1/2004 | Mahgerefteh et al. ......... 385/37 |
| 2004/0096221 | A1 | 5/2004 | Mahgerefteh et al. |
| 2004/0218890 | A1 * | 11/2004 | Mahgerefteh et al. ....... 385/147 |

OTHER PUBLICATIONS

H. Shalom et al., On the various time constants of wavelength changes of a DFB laser under direct modulation, IEEE Journal of Quantum Electronics, vol. 34, No. 10, pp. 1816-1822, 1998.

P. J. Corvini and T. L. Koch, Computer Simulation of High-Bit-Rate Optical Fiber Transmission Using Single-Frequency Lasers, Journal of Lightwave Technology, vol. LT-5, No. 11, (1987), pp. 1591-1595.

Brent E. Little, Advances in Microring Resonators, Little Optics, Inc., Integrated Photonics Research Conference, 2003.

* cited by examiner

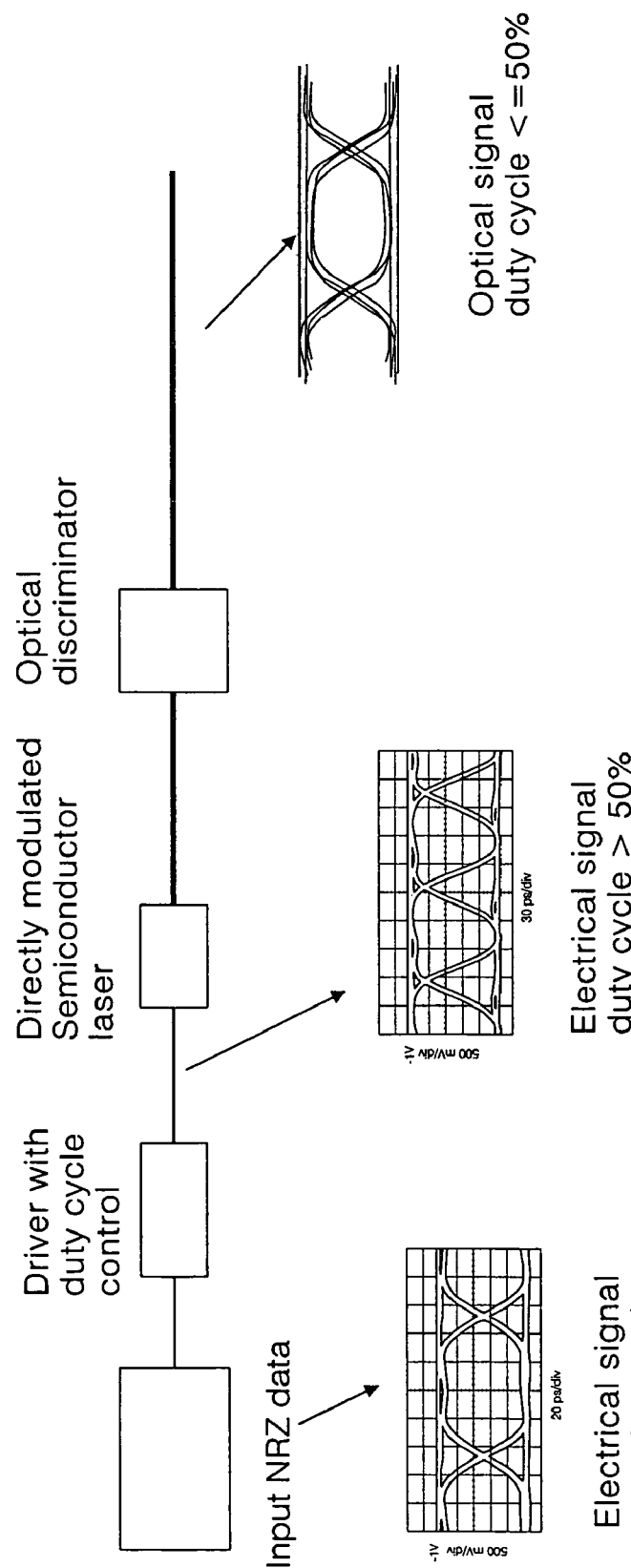
Fig. 1. Schematic of the transmitter, which consists of a driver with duty cycle control, a directly modulated semiconductor laser, and an OSR.

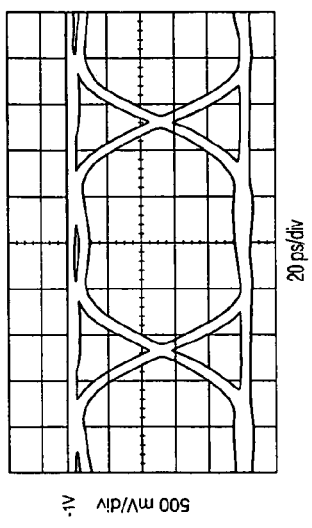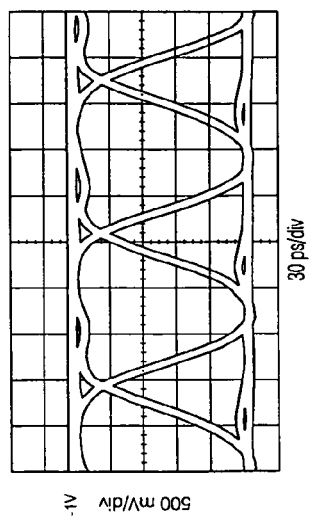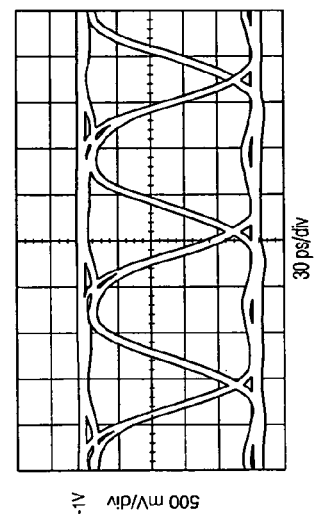
Fig. 2. Eye diagram representation of a Pseudo-random sequence of 1s and zeros with various duty cycle values at 10 Gb/s. a) 50% duty cycle, 50% crossing point, b) 60% duty cycle, c) 40% duty cycle. Figures from Agere systems TCMD0110G 10 Gb/s clocked modulator driver data sheet.

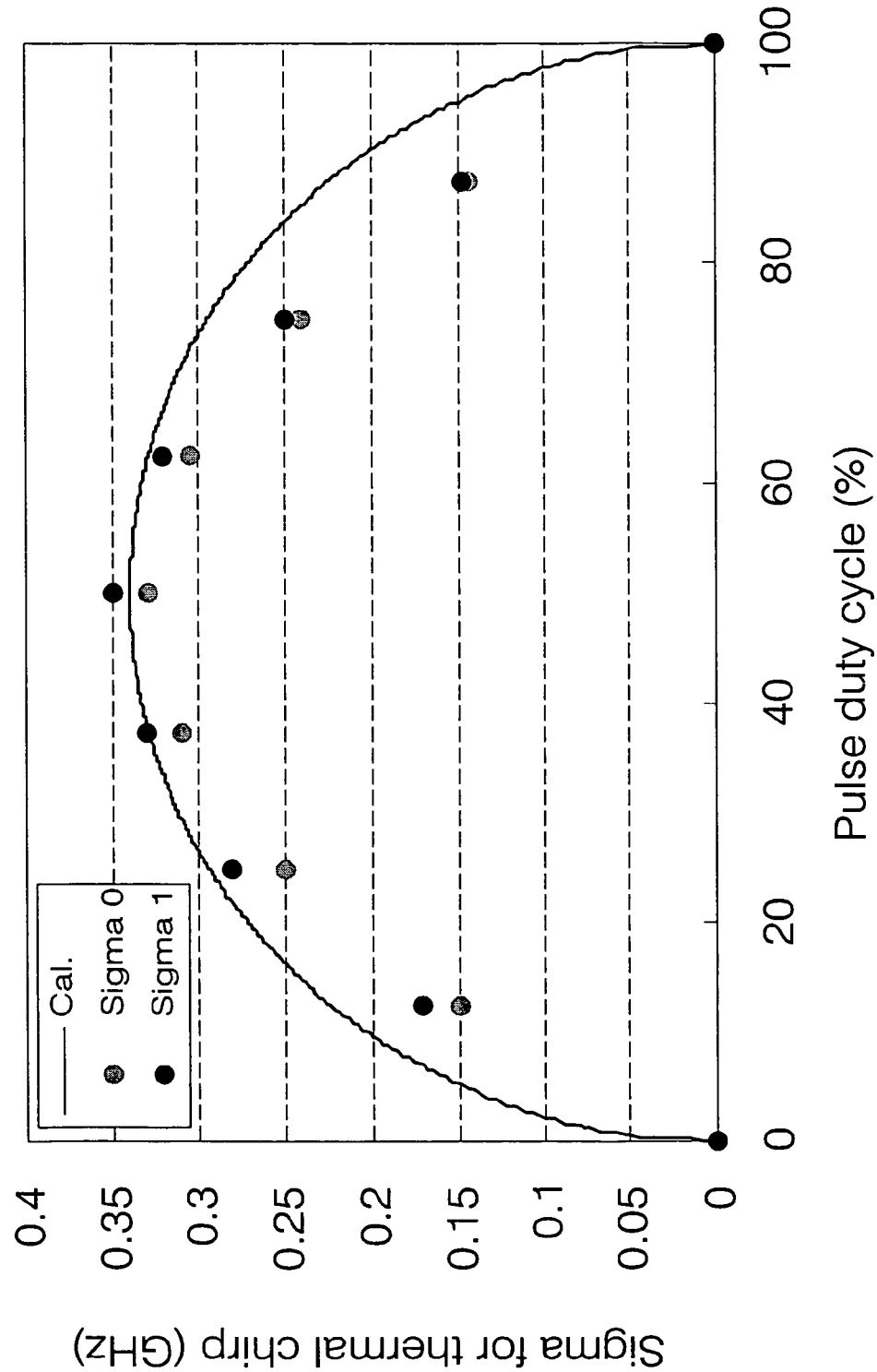
Fig. 3. Standard deviation of thermal chirp for a directly modulated semiconductor laser for a pseudo random current pulse sequence as a function of pulse duty cycle.

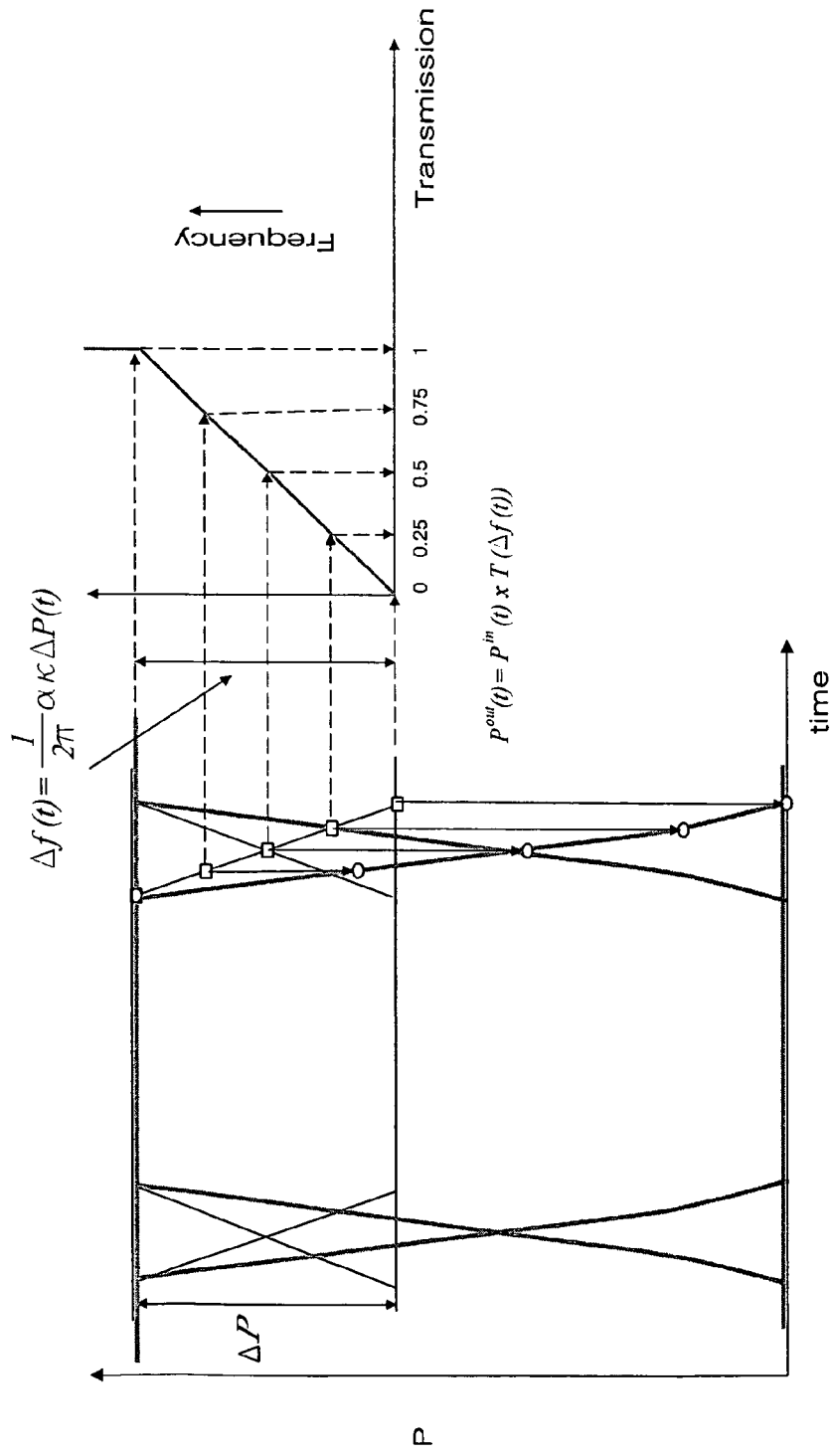
Fig. 4. Diagram showing how the OSR of $1/\Delta f$ can lower the crossing point of an input eye with 50% crossing.

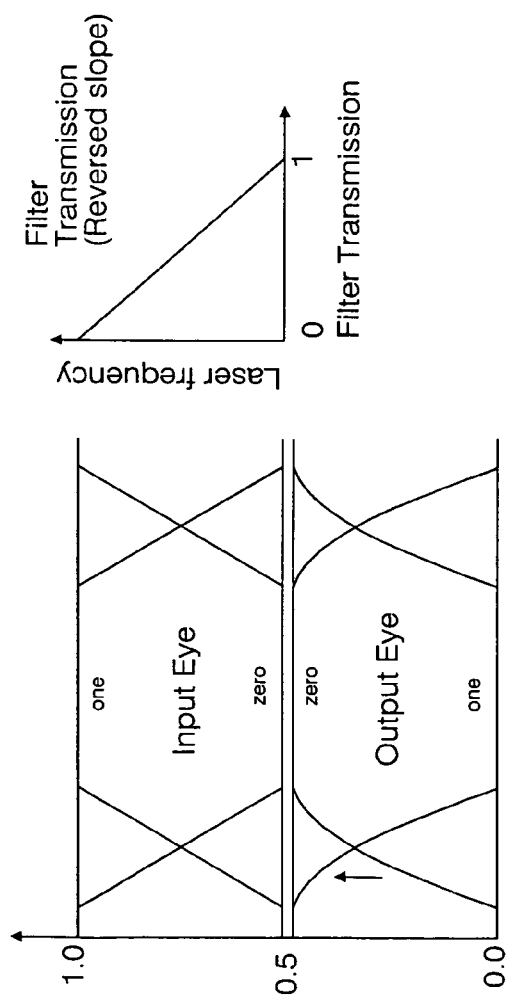
Fig. 5. Diagram showing how the OSR of $1/\Delta f$ can increase the crossing point of an input eye with 50% crossing.

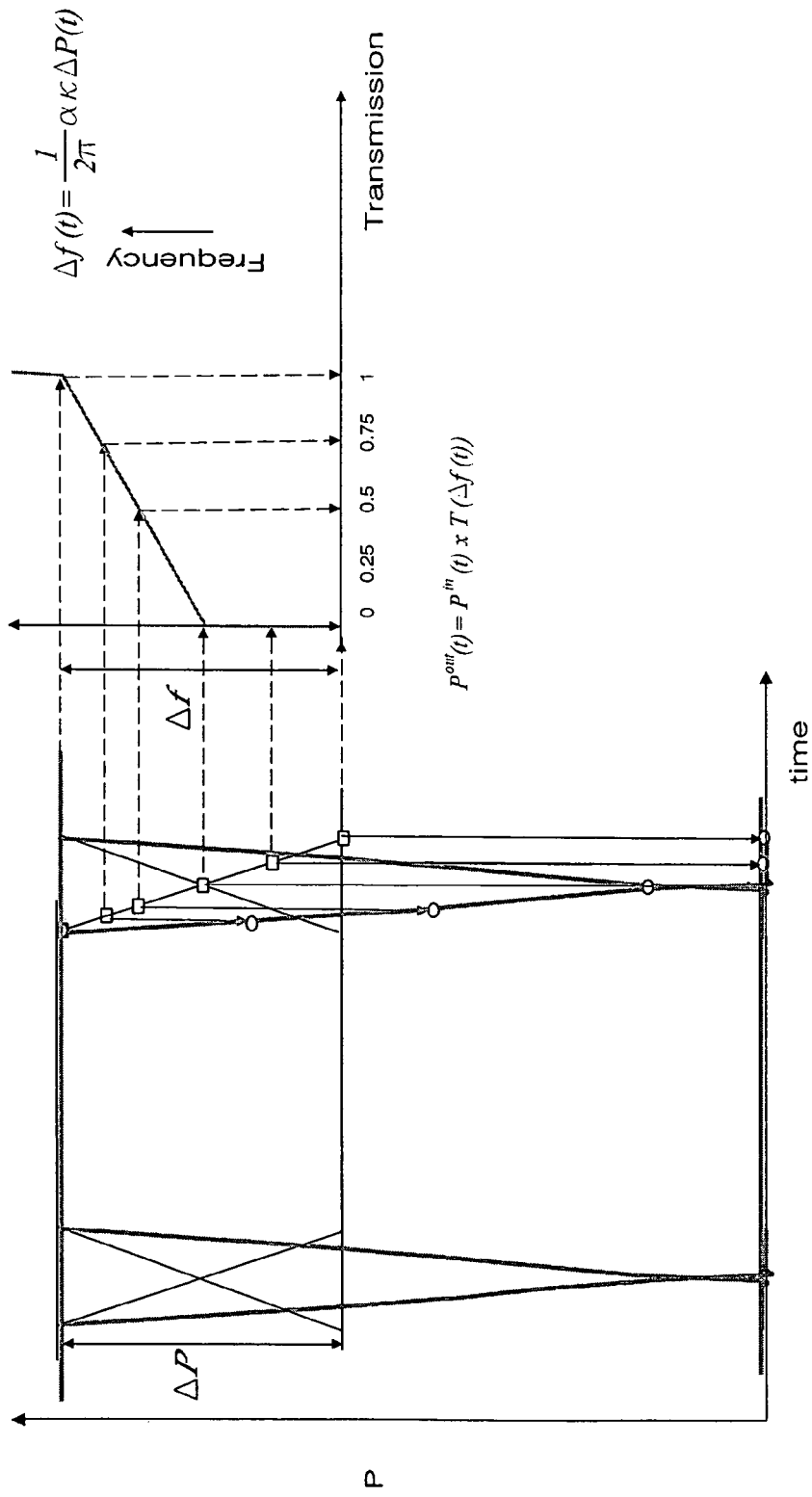
Fig. 6. Diagram showing how the OSR of a higher slope $2/\Delta f$ lowers the crossing point of an input eye further.

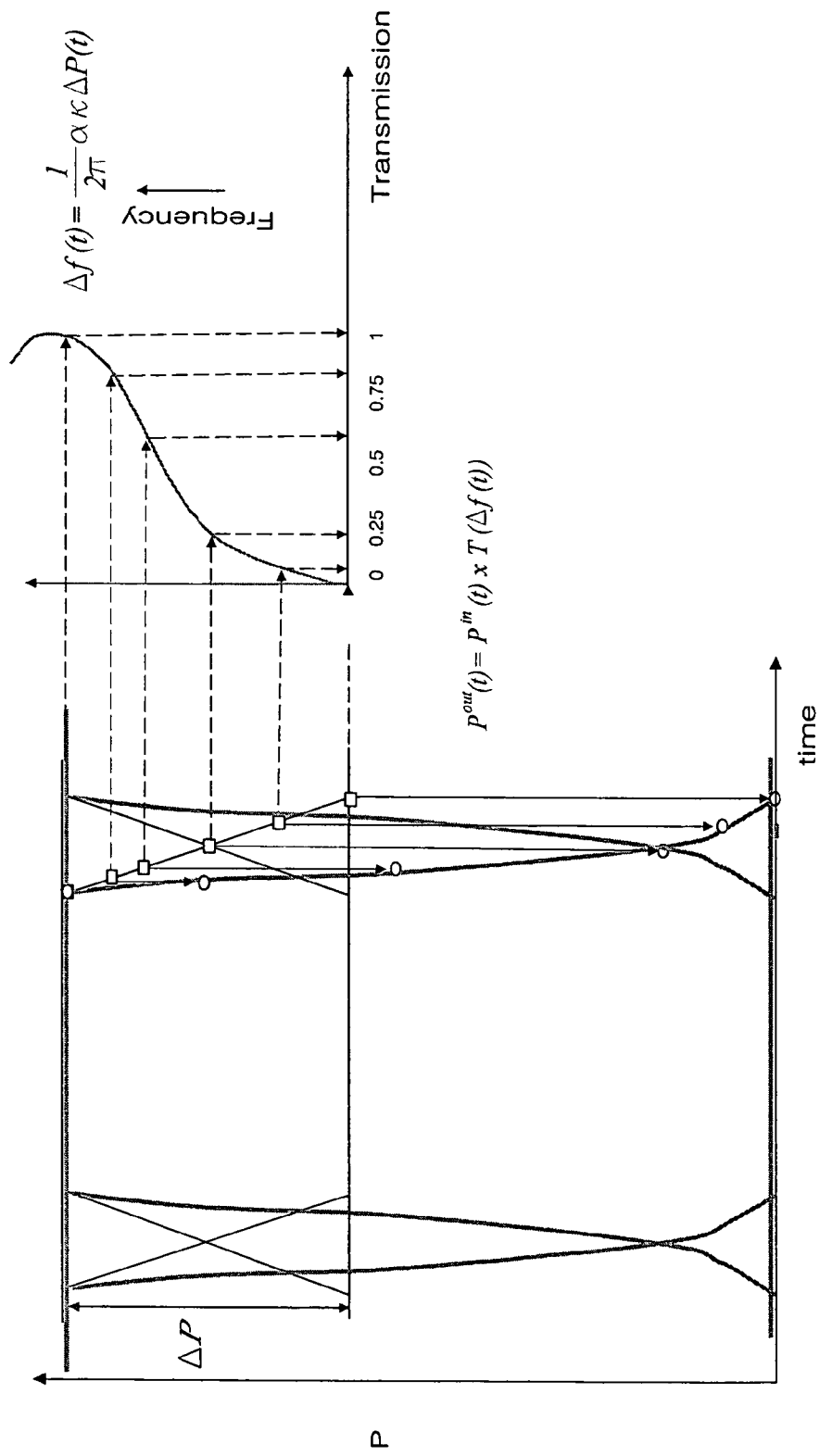
Fig. 7. A OSR with nonlinear transfer function lowers the crossing point.

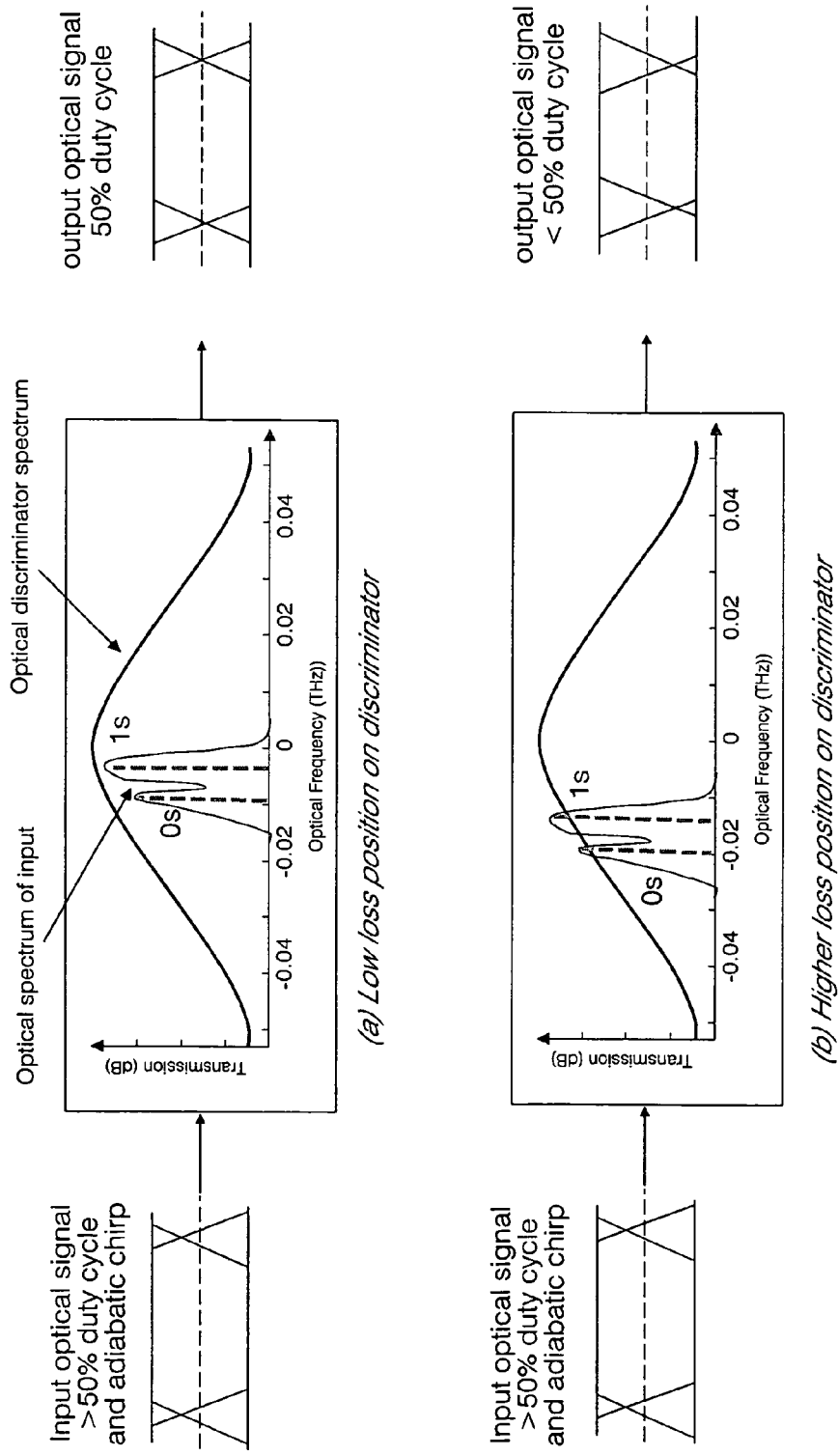
Fig. 8. A round top, Guassian filter is used to increase extinction ratio of an adiabatically chirped optical signal. As the input spectrum is shifted to the higher loss points on the filter, the crossing point on the output data is lowered further.

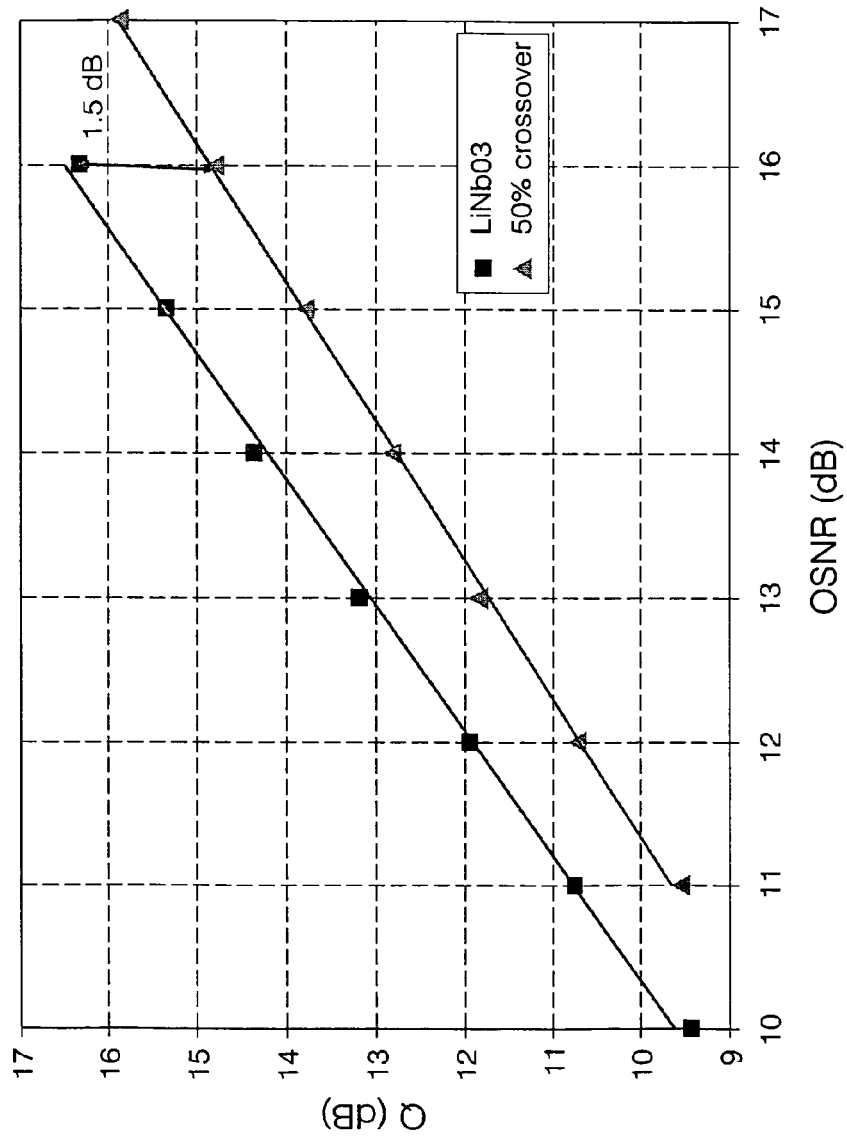
Fig. 9. Q versus OSNR for (squares) a high quality externally modulated transmitter with 25 ps rise and fall time and (triangles) a transmitter consisting of a directly modulated laser and OSR having 35 ps rise and fall times. Both signals are adjusted to have 50% crossover.

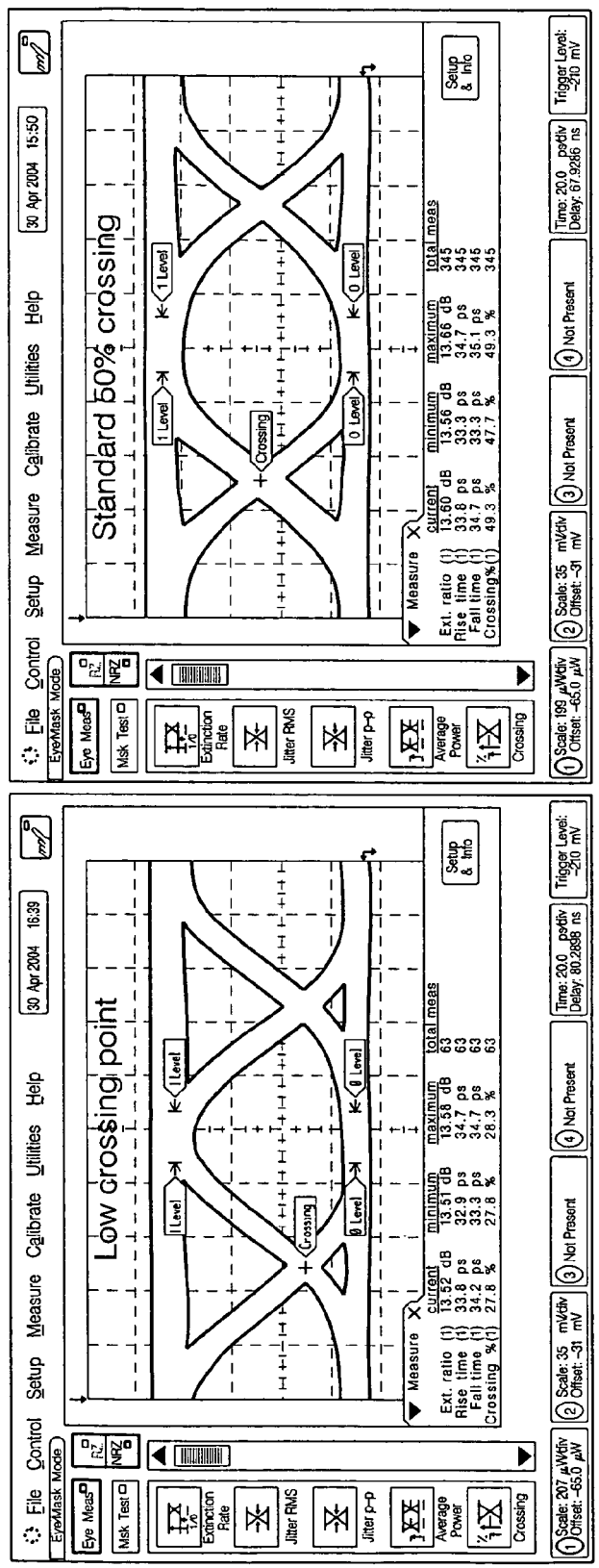
Fig. 10. Optical eye diagram of low crossing point NRZ and standard 50% crossing NRZ

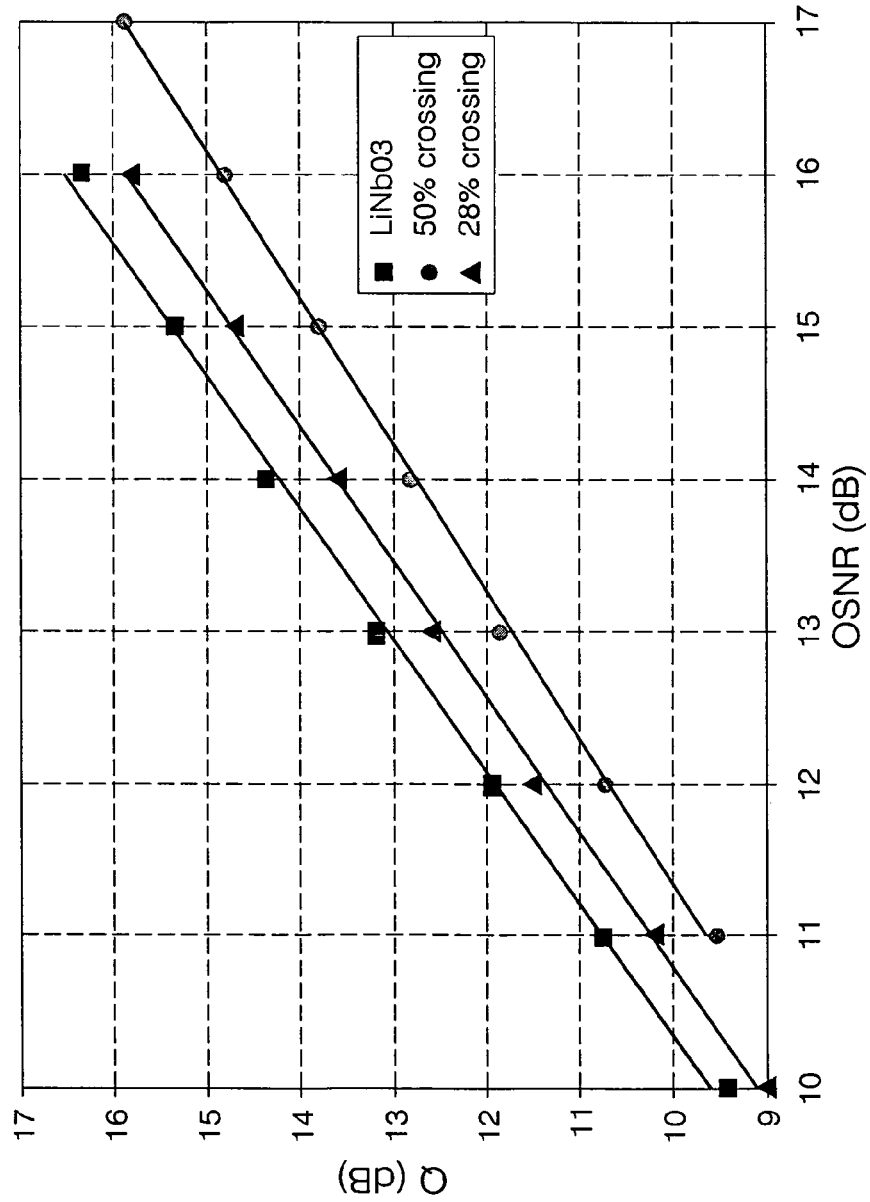
Fig. 11. Comparison of OSNR versus Q three different cases: (squares) NRZ with 20 ps rise/fall, (circles) NRZ with 35 ps rise and fall times and 50% crossing %, and (triangles) NRZ with 35 ps rise/fall times and 28% crossing.

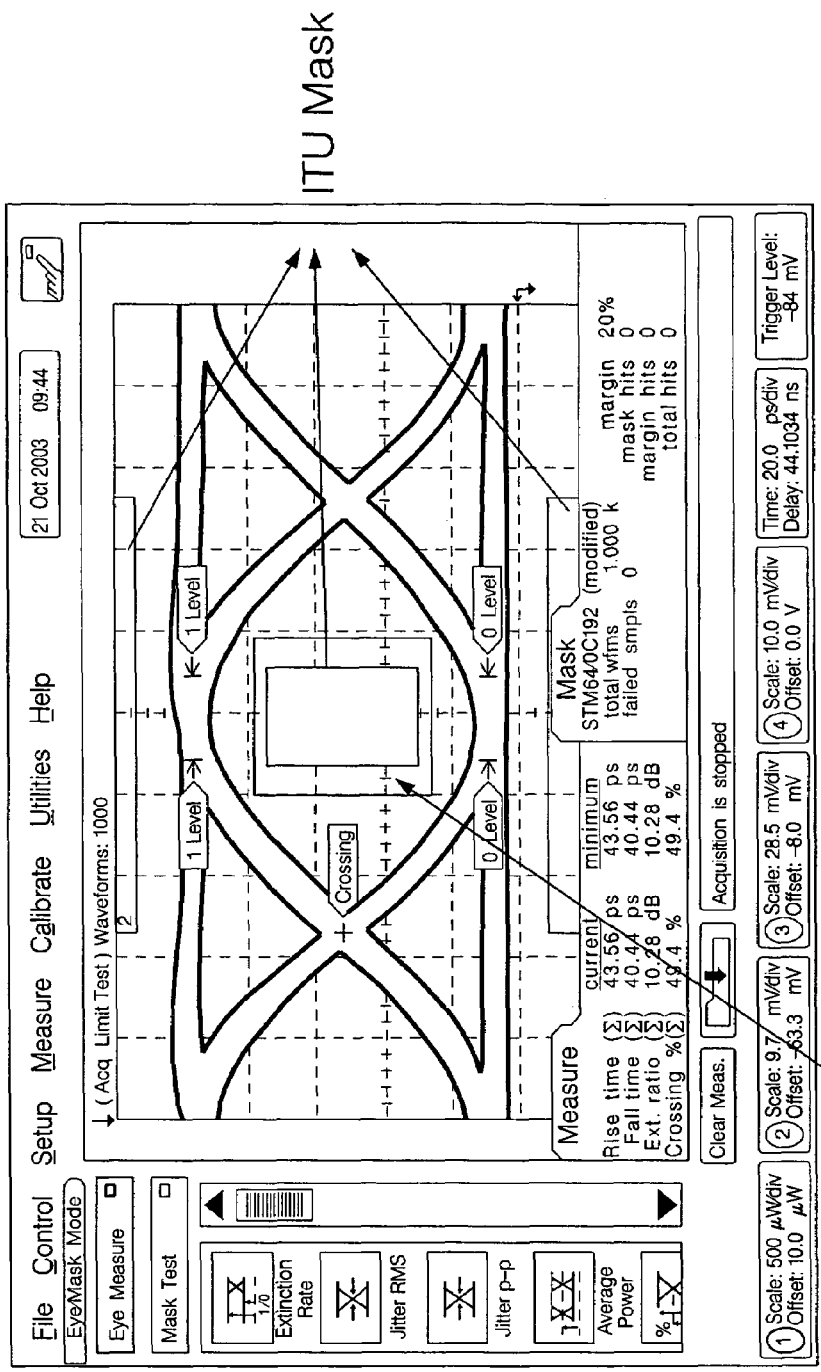
Fig. 12. Optical eye with Bassel filter and standard ITU mask.

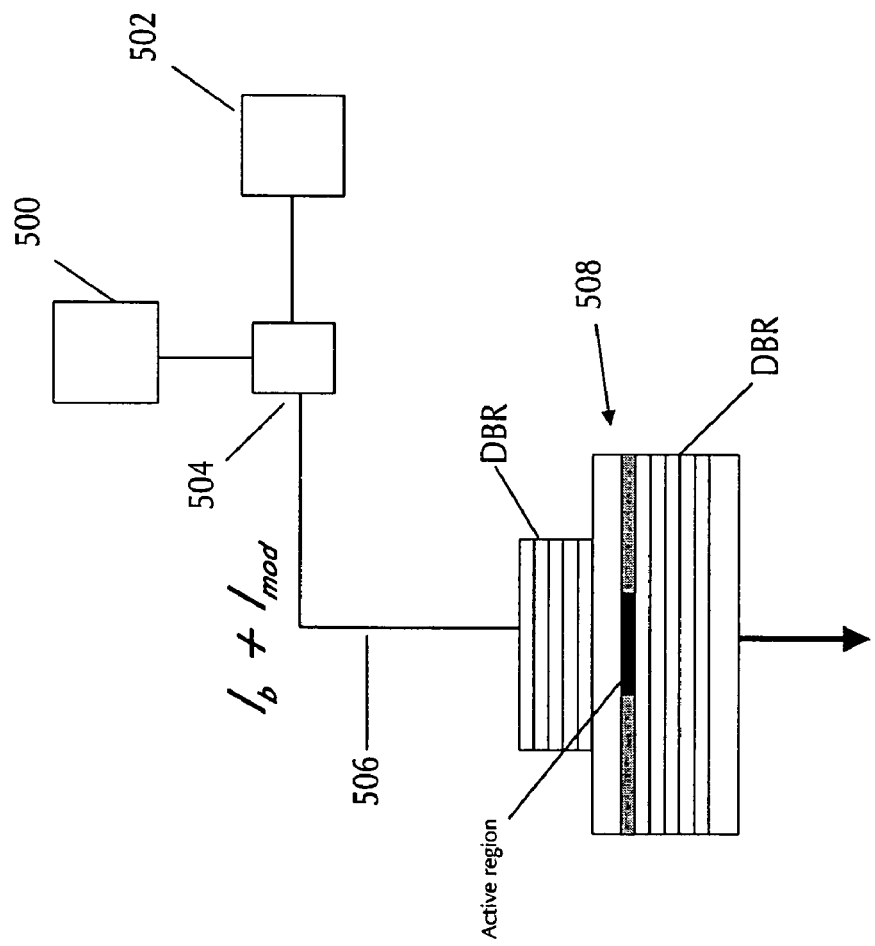
Fig. 14. Frequency modulated source consisting of a vertical cavity surface emiting laser (VCSEL).

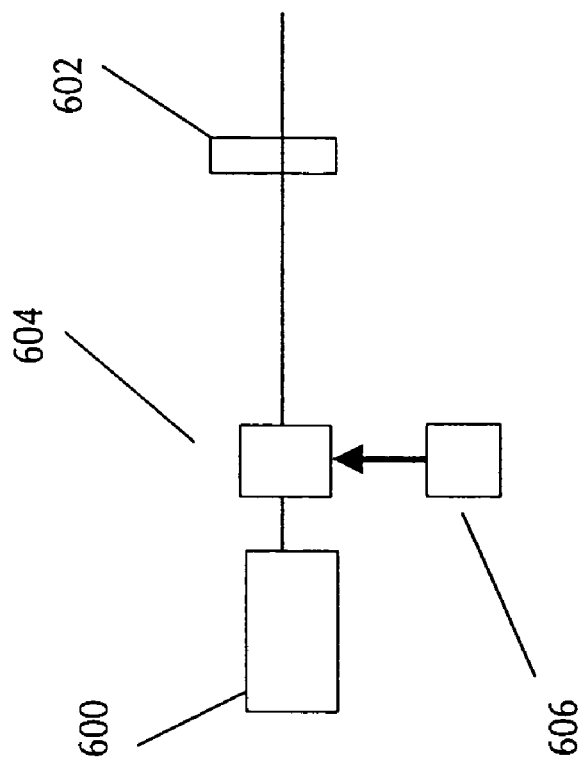
Fig. 15. A system comprising a CW laser and an externally modulated phase modulator.

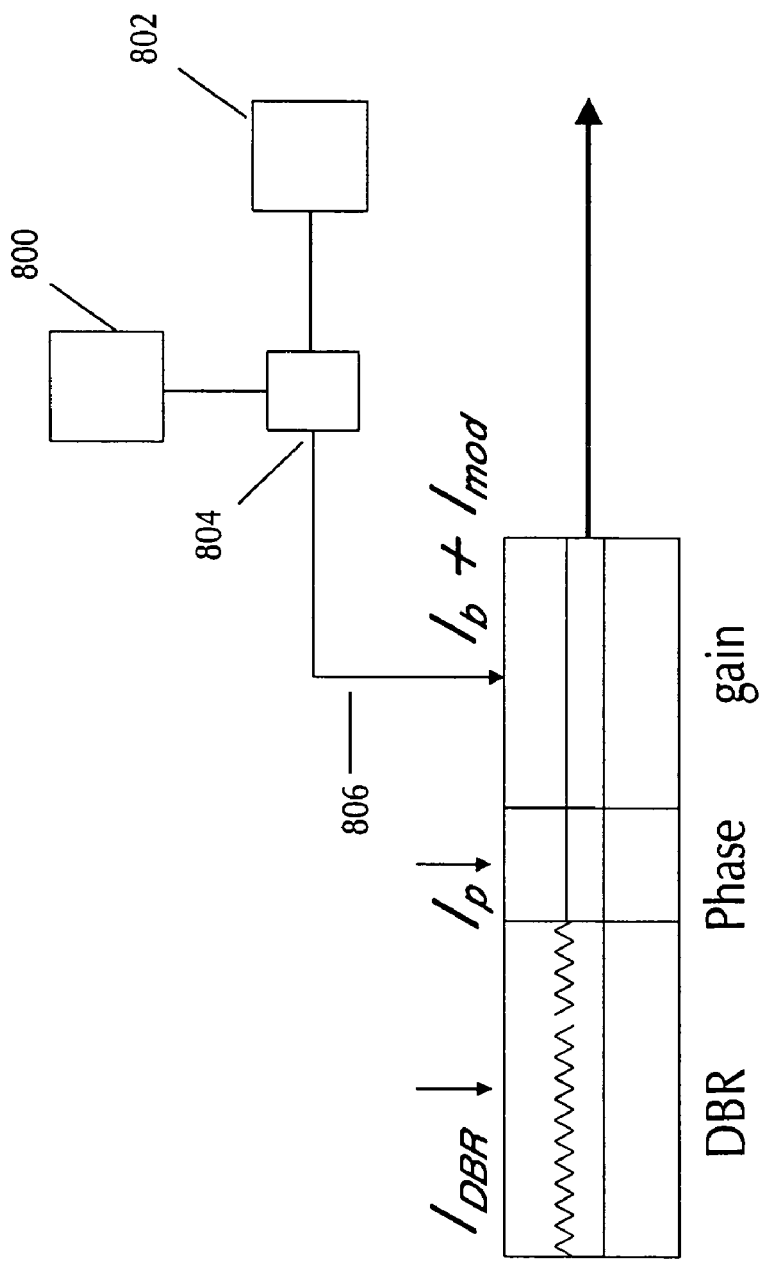
Fig. 16. A Distributed Bragg Reflector laser as an FM source.

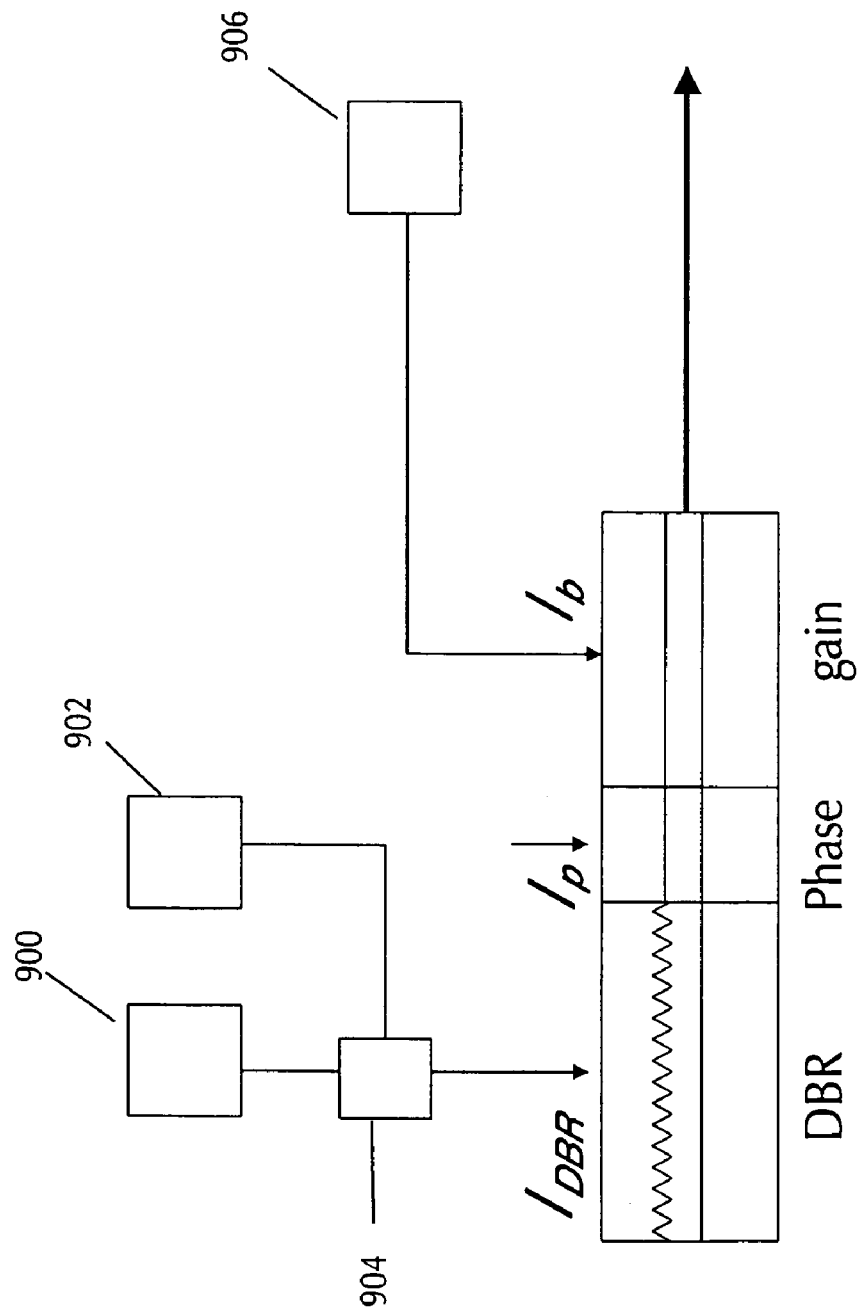
Fig. 17. A DBR laser FM modulated by modulating the current to the DBR section.

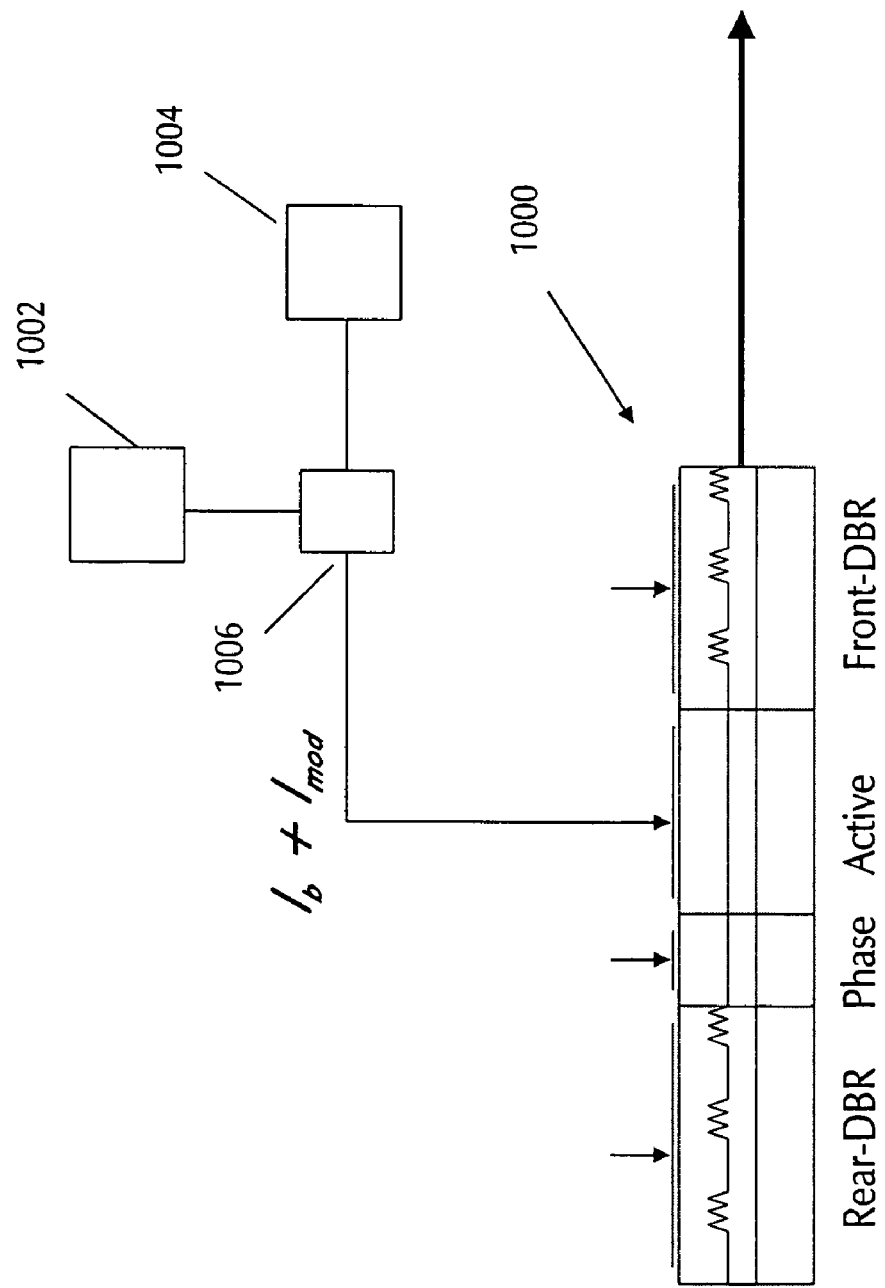
Fig. 18. A sampled grating distributed Bragg reflector laser.

METHOD AND APPARATUS FOR TRANSMITTING A SIGNAL USING THERMAL CHIRP MANAGEMENT OF A DIRECTLY MODULATED TRANSMITTER

REFERENCE TO RELATED APPLICATION

This patent application is a continuation-in-part (CIP) of prior U.S. patent application Ser. No. 10/289,944, filed Nov. 6, 2002 now U.S. Pat. No. 6,963,685 by Daniel Magherefteh et al. for POWER SOURCE FOR A DISPERSION COMPENSATION FIBER OPTIC SYSTEM.

This patent application also claims benefit of:

(i) pending prior U.S. Provisional Patent Application Ser. No. 60/500,540, filed Sep. 5, 2003 by Daniel Magherefteh et al. for THERMAL CHIRP MANAGEMENT OF DIRECTLY MODULATED TRANSMITTER;

(ii) pending prior U.S. Provisional Patent Application Ser. No. 60/530,479, filed Dec. 17, 2003 by Daniel Mahgerefteh et al. for OPTICAL TELECOMMUNICATIONS SYSTEM; and (iii) pending prior U.S. Provisional Patent Application Ser. No. 60/557,538, filed Mar. 30, 2004 by Yasuhiro Matsui et al. for REACH EXTENSION BY USING EXTERNAL FIBER BRAGG GRATING FOR SPECTRAL FILTERING.

The four above-identified patent applications are hereby incorporated herein by reference.

FIELD OF THE INVENTION

This invention relates to methods and apparatus for transmitting a signal, and more particularly to directly modulated laser transmitters whose frequency chirping is converted into an amplitude modulation after passage through an optical spectrum reshaper (OSR).

BACKGROUND OF THE INVENTION

For the purposes of this patent application, a chirp managed directly modulated (CMDM) laser transmitter comprises a directly modulated laser and an optical spectrum reshaper (OSR). In a chirp managed directly modulated (CMDM) laser transmitter, the bias current of a semiconductor laser is modulated with digital data and the resulting light output is passed through an optical spectrum reshaper (OSR). For the purposes of this patent application, an optical spectrum reshaper (OSR) is an optical element that has a transmission function which varies with optical frequency and which can be used to convert frequency modulation to amplitude modulation. The optical spectrum reshaper (OSR) may also impart a phase on the input optical signal. An optical filter is an example of an optical spectrum reshaper (OSR). With signal transmission systems of the type applying to the present invention, the input to the optical spectrum reshaper (OSR) is configured to have a small amplitude modulation and sufficiently large frequency modulation. As a result, the optical spectrum reshaper (OSR) increases the extinction ratio of the output by converting frequency modulation to amplitude modulation. In a fiber optic transmission system, which is limited by fiber dispersion, the chirp managed directly modulated (CMDM) laser provides a low chirp output in a compact package. Such a transmitter is described in pending U.S. patent application Ser. No. 10/289,944, filed Nov. 6, 2002 by Daniel Magherefteh et al. for POWER SOURCE FOR A DISPERSION COMPENSATION FIBER OPTIC SYSTEM, which patent application is hereby incorporated herein by reference.

One of the difficulties in implementing a chirp managed directly modulated (CMDM) laser transmitter is the distortion caused by conversion of thermal chirp to amplitude fluctuation after passage through the optical spectrum reshaper (OSR), which results from unwanted heating of the semiconductor laser upon current injection. The injection current used to modulate the semiconductor laser heats the active region of the laser and increases its temperature, which in turn shifts the wavelength of the laser though a change in the refractive index of the semiconductor material. Heat is generated through inter-valence band absorption in the quantum wells, as well as by joule heating in the cladding regions. This poses a particular problem in telecommunication applications, inasmuch as the laser is modulated by a "random" (i.e., variable, and hence unpredictable) stream of digital data. In this case the temperature of the laser, and hence its output wavelength, undergoes "random" (i.e., unpredictable) changes. The changes in wavelength resulting from the temperature variations in the operating laser may be referred to as "thermal chirp". The data stream-dependent changes in temperature (and wavelength) occur in time increments on the order of approximately 10-100 ns on average. Thus, even though the temperature of the laser is typically held "constant" by a thermoelectric cooler (TEC), the reaction time of the thermoelectric cooler (TEC) is typically quite slow (on the order of a few seconds) relative to the event times of the aforementioned thermal chirp. As a result, the thermal electric cooler (TEC) cannot react quickly enough to correct for the faster temperature changes brought about by the injection current, i.e., the thermal electric cooler (TEC) cannot effectively eliminate thermal chirp. These random thermal wavelength shifts are therefor converted to amplitude (i.e., intensity) fluctuations after passage through the optical spectrum reshaper (OSR), thus leading to "noise" on the 1's and 0's of the digital data stream.

The optical spectrum reshaper (OSR) can comprise a variety of filters such as, but not limited to, a coupled multi-cavity (CMC) filter, a periodic multi-cavity etalon, a fiber Bragg grating, or any other optical element having a wavelength-dependent loss. In principle, the optical spectrum reshaper (OSR) can also comprise a fiber, a Gire-Tournois interferometer, or some other element with chromatic dispersion. Chromatic dispersion also converts frequency modulation to amplitude (i.e., intensity) modulation, so that thermal chirp can be converted to unwanted "noise" on the 1's and 0's of the data stream, which in turn causes degradation of the bit error rate (BER) in a telecommunications system. It is, therefore, desirable to eliminate the thermal chirp of a directly modulated laser to the extent possible.

In "long haul" fiber optic communication systems, the signal is generally transmitted through hundreds of kilometers of fiber. In these systems, loss of signal along the fiber (typically about 0.25 dB/km) is compensated for by an optical amplifier, typically an erbium-doped fiber amplifier. This optical amplifier restores the amplitude of the signal, but at the cost of adding noise to the signal. After undergoing several amplified spans, the optical signal-to-noise ratio (OSNR) degrades, causing the bit error rate (BER) to increase. Nonlinearity and dispersion, as well as other fiber transmission impairments, also degrade the quality of the signal as it passes down the fiber, and cause errors in the data stream. The maximum transmission distance is, therefore, generally dictated by a maximum acceptable bit error rate (BER), typically $10^{-9}$. Because of the noise added by the optical amplifiers, the signal at the receiver end may have a low optical signal-to-noise ratio (OSNR). System performance is usually characterized by either the bit error rate (BER) or, alternatively, by Q (in dB) as a function of the optical signal-to-noise (OSNR) ratio. Here Q is defined by Q=20 log(efrc$^{-1}$(2BER)), where efrc$^{-1}$ is the inverse complementary error function. For example, BER=10$^{-9}$ corresponds to Q=15.6 dB. Thus, a system with a higher Q indicates a lower bit error rate (BER), i.e., a system with less signal degradation. It is, therefore, desirable to increase the value of Q in an amplified system with low optical signal-to-noise ratio (OSNR).

SUMMARY OF THE INVENTION

One object of the present invention is to provide a technique for reduction of the thermal chirp of a directly modulated semiconductor laser in a frequency discriminated transmitter.

Another object of the present invention is to provide a method for reducing the "overshoots" in the optical waveform of a transmitter comprising a directly modulated laser and an optical spectrum (OSR) reshaper.

Still another object of the present invention is to decrease the bit error rate (BER) of a digital optical signal generated by a chirp managed directly modulated (CMDM) laser transmitter in an amplified system with a low optical signal-to-noise ratio (OSNR).

These and other objects are addressed by the provision and use of the present invention.

The present invention provides a modulation scheme for reducing the thermal chirp in a semiconductor laser, reducing the waveform overshoot, or decreasing the bit error rate (BER) of the data signal at a low optical signal-to-noise ratio (OSNR), by setting the pulse duty cycle to be higher or lower than 50% or the crossing point of the pulse duty cycle to be higher or lower than 50%. The present invention also provides a scheme for adjusting the resulting offset in crossing point to a desired value, which may or may not be 50%, by using an optical spectrum reshaper (OSR), and thus achieve a reduced bit error rate (BER) after fiber transmission.

In one form of the present invention, there is provided a fiber optic transmitter comprising a digital driver adapted to adjust the crossing point of a digital base signal, an optical source adapted to receive the digital base signal and produce a frequency modulated optical signal, and an optical spectrum reshaper adapted to convert the frequency modulated optical signal to an amplitude modulated optical signal.

In another form of the present invention, there is provided a fiber optic transmitter comprising an optical source adapted to receive a digital base signal having a crossing point and produce a frequency modulated optical signal, and an optical spectrum reshaper adapted to convert the frequency modulated optical signal to a amplitude modulated optical signal, wherein the crossing point of the amplitude modulated optical signal is changed relative to the crossing point of the digital base signal.

In another form of the present invention, there is provided a fiber optic transmitter comprising a digital driver adapted to adjust the crossing point of a digital base signal, a directly modulated semiconductor laser adapted to receiver the digital base signal and produce an optical signal, characterized in that:

the crossing point of the digital base signal is adjusted to reduce the thermal chirp of the optical signal.

In another form of the present invention, there is provided a method for transmitting a signal, comprising:

adjusting the crossing point of a digital base signal;

providing the adjusted signal to an optical source to produce a frequency modulated optical signal; and providing the frequency modulated optical signal to an optical spectrum reshaper to convert the frequency modulated optical signal to an amplitude modulated optical signal.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein:

FIG. 1 is a schematic view of a transmitter, which consists of a driver with duty cycle control, a directly modulated semiconductor laser, and an optical spectrum reshaper (OSR);

FIG. 2 is a schematic view of an representation of a pseudo-random sequence of 1's and 0's with various duty cycle values at 10 Gb/s, i.e., (a) 50% duty cycle, 50% crossing point, (b) 60% duty cycle, and (c) 40% duty cycle;

FIG. 3 shows the standard deviation of thermal chirp for a directly modulated semiconductor laser for a pseudo-random current pulse sequence as a function of pulse duty cycle;

FIG. 4 is a schematic diagram showing how an optical spectrum reshaper (OSR) of slope 1/Δf can lower the crossing point of an input eye with 50% crossing;

FIG. 5 is a schematic diagram showing how the optical spectrum reshaper (OSR) of slope 1/Δf can increase the crossing point of an input eye with 50% crossing;

FIG. 6 is a schematic diagram showing how the optical spectrum reshaper (OSR) of a higher slope 2/Δf lowers the crossing point of an input eye further;

FIG. 7 is a schematic diagram showing how an optical spectrum reshaper with a nonlinear transfer function lowers the crossing point;

FIG. 8 is a schematic diagram showing how a round top, Gaussian filter is used to increase the extinction ratio of an adiabatically-chirped optical signal—as the input spectrum is shifted to the higher loss points on the filter, the crossing point on the output data is lowered further;

FIG. 9 is a schematic diagram showing Q versus optical signal-to-noise ratio (OSNR) for (squares) a high quality externally modulated transmitter with 25 ps rise and fall times, and (triangles) a transmitter consisting of a directly modulated laser and optical spectrum reshaper (OSR) having 35 ps rise and fall times, with both signals are adjusted to have 50% crossover;

FIG. 10 is a schematic diagram showing optical eye diagrams of low crossing point non-return-to-zero (NRZ) and standard 50% crossing non-return-to-zero (NRZ);

FIG. 11 is a schematic diagram showing a comparison of optical signal-to-noise ratio (OSNR) versus Q for three different cases: (squares) non-return-to-zero (NRZ) with 20 ps rise/fall, (circles) non-return-to-zero (NRZ) with 35 ps rise and fall times and 50% crossing %, and (triangles) non-return-to-zero (NRZ) with 35 ps rise/fall times and 28% crossing;

FIG. 12 is a schematic diagram showing an optical eye with Bessel filter and standard ITU mask;

FIG. 14 is a schematic diagram showing a frequency modulated source consisting of a vertical cavity surface emitting laser (VCSEL);

FIG. 15 is a schematic diagram showing a system comprising a CW laser and an externally modulated phase modulator;

FIG. 16 is a schematic diagram showing a Distributed Bragg Reflector (DBR) laser as an FM source;

FIG. 17 is a schematic diagram showing a Distributed Bragg Reflector (DBR) laser frequency modulated (FM) by modulating the current to the a Distributed Bragg Reflector (DBR) section; and FIG. 18 is a schematic diagram showing a sampled grating Distributed Bragg Reflector (DBR) laser.

DETAILED DESCRIPTION OF THE PREFERRED EMBODIMENTS

Figure 13:
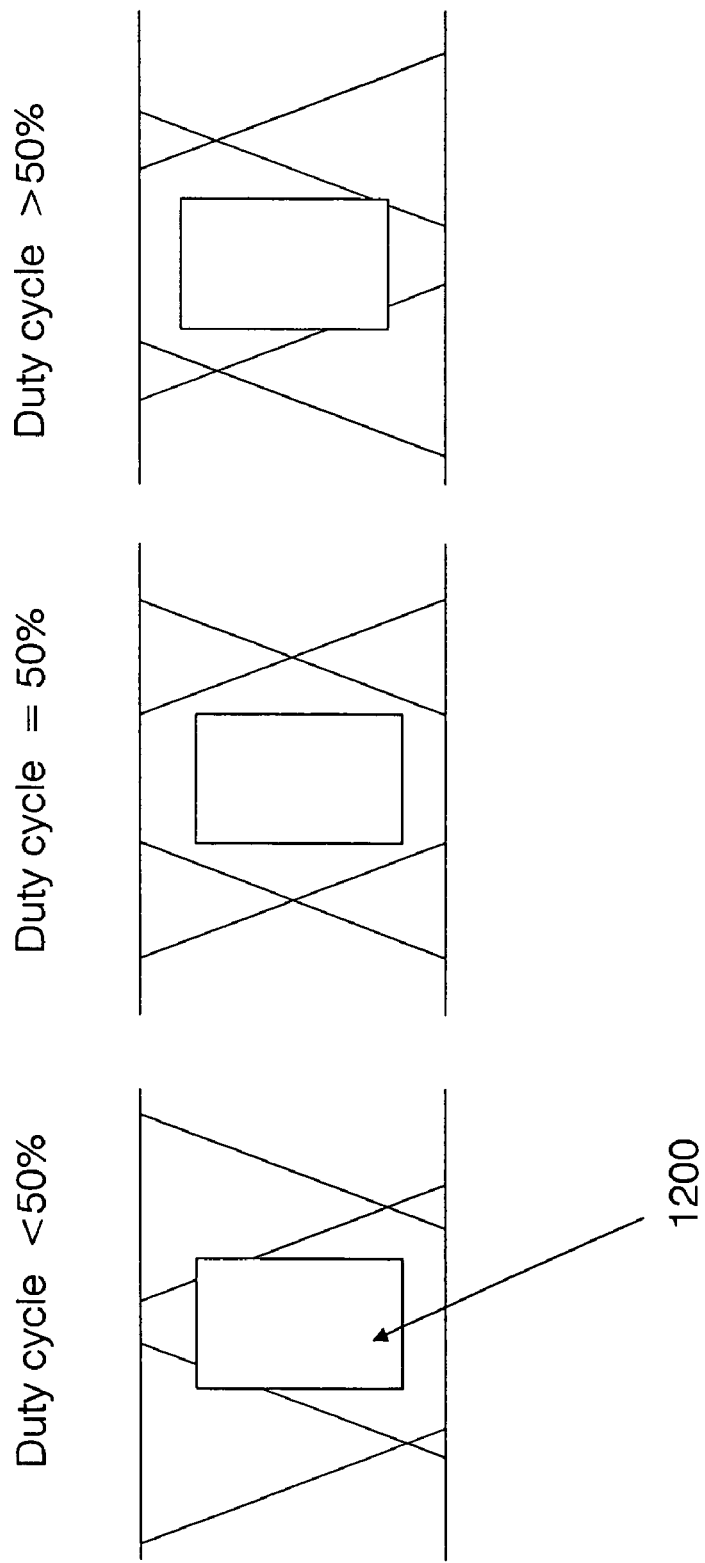
FIG. 13 is a schematic diagram showing various duty cycles.

Looking first at FIG. 1, there is shown a Chirp Managed Directly Modulated laser (CMDML) transmitter which comprises a driver with duty cycle control (described below), a directly modulated semiconductor laser, and an optical spectrum reshaper (OSR), which may also be referred to as an optical discriminator (OD) or frequency discriminator (FD). In accordance with the present invention, the semiconductor laser is driven with a duty cycle higher than 50% to reduce the thermal chirp, and the optical signal reshaper (OSR) is used to reduce the duty cycle back to 50% (or a desired value, which may be different from 50%) before the signal is transmitted down the fiber.

Digital data consists of 1's and 0's, at a bit rate, B=1/T, where T is the bit period. For a B=10 Gb/s system, T=100 ps. The 1 and 0 bits each occupy time durations $\tau_1$, and $\tau_0$, respectively, such that $$\tau_1 + \tau_0 = 2T. \qquad (1)$$

The duty cycle is defined as the fraction of the duration of the 1's to twice the bit period:

$$D = \tau_1 / 2T. \qquad (2)$$

A non-return-to-zero (NRZ) digital data stream is often shown on a sampling oscilloscope in the form of an "eye diagram,", as in FIG. 2, in which all the bits in the bit stream are folded on top of each other on the same two bit periods. In the eye diagram, the rising edge of a 1 bit crosses the falling edge of another bit at a point along the vertical amplitude axis. As used in this application, the point at which the rising edge of a 1 bit crosses the falling edge of another bit is called the "crossing point", which is determined by the duty cycle and the rise and fall times. For a bit stream having a 50% duty cycle, the crossing point is at the midpoint between the 1 level and the zero level, or 50%. The crossing point moves above 50% for a duty cycle higher than 50% (i.e., the 1's pulses are longer than the bit period) and moves below 50% for a duty cycle less than 50% (i.e., the 1' pulses are shorter than the bit period).

Assuming trapezoidal pulses with equal rise and fall times given by $\tau_r < T$, the crossing point in percent is given as a function of duty cycle by $$X = 100 \left( \frac{1}{2} + \frac{T(D/50 - 1)}{2\tau_r} \right) \qquad (3)$$

The duty cycle, and hence the crossing point, can be readily varied by most high speed digital driver electronics such as the Agere systems TCMD0110G 10 Gb/s clocked modulator driver.

The preferred embodiment of the present invention is to drive the laser with a >50% duty cycle (>50% crossing point) pulse to reduce thermal chirp and to adjust the loss point on the optical spectrum reshaper (OSR) in order to make the duty cycle after the optical spectrum reshaper (OSR) to be 50%.

First we will describe how driving the laser with a >50% duty cycle pulse reduces thermal chirp. The "random" digital data used to modulate the semiconductor laser (i.e., by current injection) tends to heat the laser randomly, depending on the sequence of 1 and 0 bits in the data stream. The laser heats slightly during a 1 bit, because of the energy deposited, and cools slightly when a 0 bit is present, at a rate which is a function of the laser's structure. The wavelength of the laser shifts proportional to the temperature change, $\Delta\lambda = (d\lambda/dT)\Delta T$, where $d\lambda/dT \sim 0.09$ nm/C is a typical value for long wavelength semiconductor lasers.

Even in the absence of thermal chirp, the wavelength of the laser changes as a function of time, depending on its output power, because of the so-called line width enhancement factor and gain compression. This chirp, is often described in terms of optical frequency and is given by $$\Delta v(t) = \frac{\alpha}{4\pi} \left( \frac{1}{P(t)} \frac{dP(t)}{dt} + \kappa P(t) \right) \qquad (4)$$

where P(t) is optical power, a is the line width enhancement factor and K is the adiabatic chirp coefficient, which is determined by the gain compression factor. The second chirp term, called adiabatic chirp, causes the 1' to be blue shifted relative to the 0's. The first chirp term, so called transient chirp, can be reduced by biasing the laser high above threshold and injecting the laser with a data amplitude that is small compared to the bias current, such that the extinction ratio of the optical output is 34 dB, as described in pending U.S. patent application Ser. No. 10/289,944, filed Nov. 6, 2002 by Daniel Maghereftech et al. for POWER SOURCE FOR A DISPERSION COMPENSATION FIBER OPTIC SYSTEM, which patent application is hereby incorporated herein by reference. Thermal chirp adds random shifts to the adiabatic chirp and causes distortions of the optical signal amplitude after passage through an optical spectrum reshaper (OSR).

A qualitative description, which is substantiated by extensive simulations, is to consider the fluctuation in temperature of the laser as a random walk problem. As the laser is injected with 1 and 0 bits at random, the laser temperature takes corresponding steps towards higher or lower temperatures with equal probability, i.e., ½. For a single input current pulse, the temperature of the laser increases by increment $dT_1 \propto \tau_1$ for a 1 bit and decreases by $dT_0 \propto \tau_0$ for a 0 bit. For the purposes of this discussion, it is assumed that the average temperature of the laser is kept constant at $<T> = T_0$ by an external thermoelectric cooler (TEC). Applying the random walk analysis with unequal steps to this case, the steady state temperature of the laser fluctuates about $T_0$, with a nonzero standard deviation given by $$\sigma_T \propto \sqrt{N\tau_1\tau_0} = A\sqrt{ND(1-D)} \qquad (5)$$

where N is the number of random bits, A is a proportionality factor, and Eq. (1) and Eq. (2) are used for the definition of duty cycle. As expected, Eq. (5) shows that the random fluctuations are removed for the case of D=0, i.e., all 0's, and D=1, i.e. all 1's, since the randomness is removed. In realistic cases, where the duty cycle is in between 0 and 1, the largest fluctuation is expected for a 50% duty cycle, i.e., D=0.5. Hence, using a duty cycle higher or lower than 50%, decreases the thermal chirp and hence the wavelength fluctuations of the laser. Simulations of the laser that include a thermal model confirm this finding.

The standard deviation for laser temperature, $\sigma_T$, was calculated for the thermal chirping using a set of three thermal equations describing the time evolution of the temperatures for the core active region of the laser ($T_1$), the surrounding region ($T_2$), and the chip ($T_3$)

$$\frac{dT_1}{dt} = \frac{(T_2 - T_1) + R_{th}^1 W_1}{\tau_1}, \qquad (6)$$

$$\frac{dT_2}{dt} = \frac{(T_3 - T_2) + (T_1 - T_2) \cdot R_{th}^2 / R_{th}^1 + R_{th}^2 W_2}{\tau_2},$$

$$\frac{dT_3}{dt} = \frac{(T_{ref} - T_3) + (T_2 - T_3) \cdot R_{th}^3 / R_{th}^2 + R_{th}^3 W_3}{\tau_3}.$$

$T_{ref}$ is the heat sink temperature for the chip. The thermal time constants ($\tau$) and thermal resistivities ($R_{th}$) for the corresponding regions were determined from the experimental chirp measurement in time domain. The measured thermal time constants were $\tau_1$=15 ns, $\tau_1$=150 ns, and $\tau_1$=4 μs for the core, surrounding, and the chip regions, respectively. The measured thermal resistivities were $R_{th}$=8 K/W, $R_{th}$=4 K/W, and $R_{th}$=10 K/W, respectively. The heat generation for the active and the surrounding region is due to optical re-absorption and Joule heating. In the above simulation, only absorption heating was taken into account for simplicity. The red and blue dots in FIG. 3 are the calculated sigma for thermal chirping for the 1's and 0's, respectively. Those two quantities have to be equal by definition. In the simulation, the deviation between the 1's and 0's is due to the limited time resolution of numerical simulations.

The solid green line in FIG. 3 is a calculation based on the analytical formula given by Eq. (5). As can be seen in FIG. 3, both numerical and analytical calculations predict maximum sigma for thermal chirp at a duty cycle of 50%. Sigma for thermal chirp can be reduced by setting a duty cycle toward either zero or one.

An optical spectrum reshaper (OSR) may be used to change the duty cycle of the sequence of pulses having adiabatic chirp. FIG. 4 shows how an optical spectrum reshaper (OSR) having a transmission versus frequency slope 1/Δf can lower the crossing point of an input data sequence (represented by an "eye" diagram) with adiabatic chirp. The laser is assumed to be modulated with a 3 dB extinction ratio and a 50% duty cycle (i.e., 50% crossing point). The optical frequency of the output light nearly follows the optical power as described by Eq. (4), with the first (transient chirp) term neglected. Transient chirp can be minimal when the laser is biased high above threshold and driven with a low (e.g., 2-4 dB) extinction ratio, as shown in FIG. 4. Every point on the intensity profile of the pulse is mapped to a loss point on the optical spectrum reshaper (OSR) corresponding to its optical frequency. If the bandwidth of the optical spectrum reshaper (OSR) is much higher than that of the input optical signal, the output of the filter can be written as $$P^{out}(t) = P^{in}(t) \times T(\Delta f(t)) = P^{in}(t) \times T\left(\frac{\alpha}{4\pi} \kappa \Delta P^{in}(t)\right) \qquad (7)$$

FIG. 4 neglects the limited bandwidth of the optical spectrum reshaper (OSR), which can broaden the output pulse. However, it correctly predicts the trend of lowering the crossing point, and may be used to describe the principle of operation of the present invention. Even for a linear optical spectrum reshaper (OSR), Eq. (7) predicts that the output pulse shape is a nonlinear function of input shape, so that the lower the power, the lower the chirp, and the lower the transmission, leading to a sharpening of the transitions and lowering of the crossing point, as shown in FIG. 4.

Note that if the sign of the slope of the optical spectrum reshaper (OSR) is reversed, as shown in FIG. 5, the crossing point after the optical spectrum reshaper (OSR) will move up, producing pulses with a duty cycle higher than 50%. As used in this application, the term positive slope is intended to mean an increase in relative optical transmission with increasing optical frequency and a negative slope is intended to mean a decrease with relative transmission with increased optical frequency.

FIG. 6 shows that the crossing point is lowered for a filter with higher slope. In this example, the slope is 2/Δf, twice the value of that in FIG. 4.

FIG. 7 shows the use of an optical spectrum reshaper (OSR) with a nonlinear transfer function, which can exaggerate the lowering of the crossing point by weighting the pulse shape more on the 0's side than on the 1's side.

In the preferred embodiment of the present invention, the optical spectrum reshaper (OSR) is a rounded top, Gaussian filter. The duty cycle, and hence the crossing point, of the output of the filter can by adjusted to lower values by shifting the input spectrum to the higher loss points on the filter. This is because the slope of the filter increases with increasing loss position, as shown in FIG. 8.

Pulse duty cycle affects the dispersion of the optical signal through dispersive fiber. For a non-return-to-zero (NRZ) data pattern, a 50% duty cycle produces the least distortion and hence the lowest bit error rate. This is because the bandwidth of the signal is the minimum in this case.

Hence, in the preferred embodiment of the present invention, the pulse duty cycle of the electrical signal driving the laser is set to be higher or lower than 50% so as to reduce the thermal chirp, while the loss position on the optical spectrum reshaper (OSR) is chosen to set the output duty cycle back to 50% for lowest distortion, and hence lowest bit error rate (BER), upon propagation in dispersive fiber.

In accordance with the present invention, the frequency chirping due to thermal effect (i.e., the thermal chirp) in directly modulated semiconductor lasers can be suppressed by setting the pulse duty cycle to be higher or lower than 50%. Furthermore, the offset (from the 50% level) in the pulse duty cycle provides an additional degree of freedom in choosing the operating point in the downstream optical spectrum reshaper (which converts the frequency chirping into amplitude modulation) by locating the center frequency of the transmission spectra in the Gaussian optical spectrum reshaper (OSR) close to the spectral peak for 1's. Thus, the loss in the optical spectrum reshaper (OSR) can be reduced while still achieving a 50% crossing point. Based on the same principle, the extinction ratio after the optical spectrum reshaper (OSR) can be improved while still maintaining a 50% crossing point by locating the center frequency of the transmission spectra in the Gaussian optical spectrum reshaper (OSR) away from the spectral peak for 1's.

In another embodiment of the present invention, the crossing point at the output of the optical spectrum reshaper (OSR) is adjusted to be less than 50% so as to decrease the bit error rate (BER) of the signal in an amplified system with a low optical signal-to-noise ratio (OSNR).

For an optical binary signal, a slower rise/fall time can reduce Q, or increase the bit error rate (BER) penalty, compared to an ideal signal for the same extinction ratio. The rise/fall time is normally defined by the amplitude changes from 20% to 80% in this description.

FIG. 9 shows Q versus optical signal-to-noise ratio (OSNR) for two digital signals: one generated by an externally modulated LiNbO$_3$ transmitter with 25 ps rise and fall times, and the other generated by a chirp managed directly modulated (CMDM) laser transmitter having 35 ps rise and fall times. Both signals have the same extinction ratio. The signal with shorter rise and fall times shows 1.5 dB higher Q, and hence lower bit error rate (BER), than the signal with the longer rise and fall times. In this situation, the chirp managed directly modulated (CMDM) laser transmitter's bit error rate (BER) is said to have a 1.5 dB penalty relative to the externally modulated transmitter signal. In accordance with the present invention, the bit error rate (BER) of the chirp managed directly modulated (CMDM) laser transmitter may be decreased by lowering the crossing point at the output of the transmitter.

In accordance with the present invention, the Q penalty may be reduced by lowering the crossing point. FIG. 10 shows the eye diagrams of a signal with crossing point <50%, as well as standard non-return-to-zero (NRZ) eye with 50% crossing point. Note that the low crossing eye has a wider flat time window near the 0 bits between the 1-to-0 and 0-to-1 transitions than the standard 50% crossing eye. This time window is called phase margin. For low optical signal-to-noise ratio (OSNR), the 1 bits are noisier than the 0 bits, since their noise is dominated by beat noise between signal and ASE, and 1's have higher signal level. Hence, the optimum decision level (discriminator level) in the receiver is closer to the 0 bits. Usually the mid-point of the eye in the time between the 1-to-0 and 0-to-1 transitions is chosen by the decision circuit (discriminator circuit) at the receiver to distinguish between 1's and 0's. In addition, the transitions can have phase noise or jitter, moving randomly from left to right by small amounts due to noise or other transmission impairments. Hence, a wider time window around the decision time leads to lower probability of errors and hence a lower bit error rate (BER) and higher Q.

FIG. 11 shows the Q vs. optical signal-to-noise ratio (OSNR) for the output of a chirp managed directly modulated (CMDM) laser with 50% crossing, 28% crossing, and an externally modulated non-return-to-zero (NRZ) signal with 50% crossing. In this example the rise and fall times of the chirp managed directly modulated (CMDM) laser transmitter were 35 ps. The extinction ratio was ER=13.5 dB in all of the three cases. The Q penalty for the chirp managed directly modulated (CMDM) laser transmitter is reduced from 1.5 dB to 0.5 dB for the 28% crossing point case, comparing to the LiNbO$_3$ transmitter. Note that the same concept applies to any transmitter with longer rise and fall times. Lowering the crossing point, or equivalently the duty cycle of the pulse, improves the phase margin and therefore increases the Q for low optical signal-to-noise ratio (OSNR).

In another embodiment of the present invention disclosed in pending U.S. Provisional Patent Application Ser. No. 60/530,479, filed Dec. 17, 2003 by Daniel Mahgerefteh et al. for OPTICAL TELECOMMUNICATIONS SYSTEM, which patent application is hereby incorporated herein by reference, by adjusting the crossing point on the driver or by changing the loss point of operation on the optical spectrum reshaper (OSR) distortions of the optical eye can be reduced to help pass the ITU mask test. Telecommunications standards require a certain eye opening as determined by a square shaped "mask" which is superimposed on the optical eye measured in a high speed sampling scope. For this test, the optical signal is detected with a high speed scope and passed through a low pass electrical Bessel filter which blocks the high frequencies. For 10 Gb/s, for example, the bandwidth of the Bessel filter is 7 GHz. FIG. 12 shows an example of such an eye diagram with the ITU mask superimposed. It is typical to require a certain margin around the mask. A transmitter output is said to pass the mask test if no parts of the waveform hit the mask for a certain number of accumulated waveforms, e.g., 1000 accumulated waveforms.

FIG. 13 shows a series of eyes having different crossing points, and 1200 represents the mask. In this example, the eye hits the top of the mask in the case where the crossing point, and hence the duty cycle, is less than 50%; and hits the bottom of the mask in the case where the duty cycle is greater than 50%; in both of which cases the eye fails the mask test. For this example, the eye opening is optimized and the mask test passed when the duty cycle is 50%. The crossing point for a chirp managed directly modulated (CMDM) laser can be adjusted by changing the crossing point of the electrical base band signal at the driver, or by changing the operating point on the optical spectrum reshaper (OSR) in order obtained the desired crossing point and obtain the desired eye opening as defined by a certain eye mask.

A variety of laser sources may be used in place of the directly modulated semiconductor laser: These include (1) single wavelength semiconductor lasers; (2) externally modulated semiconductor lasers; and (3) tunable semiconductor lasers. There are several types of single wavelength lasers such as DFB edge emitter lasers, external cavity lasers, and vertical cavity surface emitting lasers (VCSEL's). The VCSEL's DFBs, and external cavity lasers may be directly modulated to produce a signal that is frequency modulated. An example of such an external cavity laser source is described in pending U.S. Provisional Patent Application Ser. No. 60/557,538, filed Mar. 30, 2004 by Yasuhiro Matsui et al. for REACH EXTENSION BY USING EXTERNAL FIBER BRAGG GRATING FOR SPECTRAL FILTERING, which patent application is hereby incorporated herein by reference. The VCSEL's may be made of two distributed Bragg reflector (DBR) mirrors, each formed by a stack of alternating layers of high and low refractive index materials to produce high reflectivity mirrors vertical to the growth surface. The gain medium may be sandwiched between two such DBR mirrors. FIG. 14 illustrates a combiner 504 capable of combining the modulation signal from a driver 500 and a dc bias source 502 to provide a summed $I_b+I_{mod}$ signal 506 that is used to directly modulate a VCSEL 508. The sum signal or current 506 is supplied to bias the laser above the threshold and modulate its gain, and therefore modulate the frequency of the output to produce a partially frequency modulated signal.

FIG. 15 illustrates that the optical signal from a continuous wave (CW) source 600 may be externally phase modulated before being filtered by the optical discriminator 602. The output from the CW laser 600 may enter a phase modulator 604 followed by the optical spectrum reshaper (OSR) 602. An electrical signal from an external driver 606 having means for adjusting the crossing level may drive the modulator 604 that may impart a phase shift on the CW signal after the laser. The optical spectrum reshaper (OSR) 602 may then convert the FM modulation to AM modulation and simultaneously change the crossing point. A variety of different types of external phase modulators 606 may be used, such as a semiconductor modulator, a LiNbO$_3$ phase modulator, or a semiconductor optical amplifier (SOAP). A SOAP is normally used to provide gain. It is biased at a high current and has substantially more gain than loss. Care may need to taken to remove feedback paths to the SOAP, or it may become a laser.

FIG. 16 illustrates the use of tunable laser sources for producing the FM modulated signal. The laser source producing the FM modulated signal may be a distributed Bragg reflector (DBR) laser, where the Bragg grating may be separate from the gain section. By way of background, a DFB laser may be formed from a Bragg grating over the entire laser structure. A DBR laser generally has three sections: (1) a gain section; (2) a distributed Bragg reflector section; and (3) a phase section. These separate sections may be electrically isolated and biased by different currents. As illustrated in FIG. 16, the current to the gain section may be modulated to produce an amplitude and frequency modulated signal. A modulation signal $I_{mod}$ produced by the driver 800 having means for adjustment of the crossing percentage may be combined with the dc bias current $I_b$ from a second source 802 using a bias-T or other combiner 804. The sum current $I_b+I_{mod}$ 806 may be used to modulate the laser high above threshold as described above for a DFB. The current to the DBR section may be used to tune the center wavelength, and the phase section may be used to prevent the device from mode hopping, as is discussed in the case of CW.

FIG. 17 illustrates that the DBR laser may be frequency modulated by modulating the current of the DBR section that controls the wavelength in the output of the laser. A modulation signal from a driver 900 having means for adjusting the crossing percentage may be combined with a dc current from a source 902 using a combiner 904 to drive the DBR section. The dc component 902 may control the center wavelength of the operation, and the modulating current may produce the desired frequency modulation. The gain section may be biased using a dc current source 906. The output from laser may then pass through an optical spectrum reshaper (OSR) which can be used to adjust the crossing point to the desired value.

FIG. 18 illustrates a sampled grating distributed Bragg reflector laser (SGDBR) 1000. A SGDBR laser 1000 may have four sections: (1) a sampled grating in the back; (2) a phase section; (3) a gain section; and (4) a sampled grating in the front. The function of the gain section and phase section are similar to the DBR laser described above. However, in a SGDBR, the lasing wavelength may be determined by both the front and back distributed reflectors. A sampled grating is a grating with a certain periodicity that may have its index change spatially modulated in order to provide a periodic reflection coefficient. The FM modulated signal may be produced in a variety of ways. For example, the FM modulated signal may be produced by directly modulating the gain section of the laser as in FIG. 18. In such a case, the modulation signal $I_{mod}$ from a driver 1002, having means for adjustment of the crossing percentage, may be combined with a dc bias $I_b$ from a dc current source 1004 using a combiner 1006, and the resulting sum current $I_b+I_{mod}$ may be used to modulate the gain section. This produces an FM modulated signal that may be input to the optical spectrum reshaper (OSR) whereby the operation point on the optical spectrum reshaper (OSR) can be adjusted to obtain the desired crossing point as described above.

FIG. 19 illustrates that the gain section may be biased using a dc current source 1200. The front sampled grating section may be supplied with a modulated current from a driver having means for adjusting the crossing point to produce the FM modulated signal. The signal from a modulator 1202 may be combined with a dc current from a dc source 1204 using a combiner 1206 and the sum current supplied to the sampled grating section. The dc bias current may determine the center wavelength of the output signal together with the current supplied to the back reflector. The modulation signal produces the FM signal needed to be supplied to the optical spectrum reshaper (OSR), where the loss point of operation is used to produce the desired crossing percentage. Note that the FM modulating signal may also be supplied to the back mirror as well to the front.

The optical spectrum reshaper may be a variety of optical filters having a optical frequency dependent loss profile. Examples are a coupled multicavity etalon, a Fabry-Perot etalon, a fiber Bragg grating filter, an arrayed waveguide grating filter, coupled multi-ring resonator filters, thin film filters, a sampled Bragg grating filter, etc.

It is to be understood that the present invention is by no means limited to the particular constructions herein disclosed and/or shown in the drawings, but also comprises any modifications or equivalents within the scope of the invention.

What is claimed is:

1. A fiber optic transmitter comprising a digital driver configured to generate a digital base signal transitioning between high and low signal levels, the digital driver further configured to maintain a crossing point of the digital base signal at an offset signal level substantially different from a middle signal level located at 50% of a distance between the high and low signal levels; an optical source adapted to receive the digital base signal and produce a frequency modulated optical signal, the offset signal level being offset from the middle signal by an amount effective to reduce thermal chirp in the frequency modulated optical signal; and an optical spectrum reshaper adapted to convert the frequency modulated optical signal to an amplitude modulated optical signal.

2. A fiber optic transmitter according to claim 1 wherein the digital driver is configured to maintain the crossing point of the digital base signal having the offset signal level higher than the middle signal level.

3. A fiber optic transmitter according to claim 2 wherein the optical spectrum reshaper has an optical transmission transfer function effective to cause a crossing point of the amplitude modulated optical signal to be substantially equal to a signal level located at about 50% of a distance between a high and a low level of the amplitude modulated optical signal.

4. A fiber optic transmitter according to claim 2 wherein the optical spectrum reshaper has an optical transmission transfer function effective to cause a crossing point of the amplitude modulated optical signal to be equal to a signal level less than 50% and higher than 20% of a distance from the low level to the high level of the amplitude modulated optical signal.

5. A fiber optic transmitter according to claim 1 wherein the optical source is a directly modulated semiconductor laser.

6. A fiber optic system according to claim 1 wherein the optical source is an external cavity laser.

7. A fiber optic transmitter according to claim 1 wherein the optical spectrum reshaper comprises a multi-cavity etalon.

8. A fiber optic transmitter according to claim 1 where the optical spectrum reshaper comprises a coupled multi-cavity thin film filter.

9. A fiber optic transmitter according to claim 1 wherein the optical spectrum reshaper is adapted to have positive slope to reduce the crossing point of the amplitude modulated optical signal relative to crossing point of the digital base signal.

10. A fiber optic transmitter according to claim 9 wherein the crossing point of the amplitude modulated optical signal is substantially equal to a signal level located at 20% to 35% of a distance from a low to a high level of the amplitude modulated optical signal.

11. A fiber optic transmitter according to claim 9 wherein the crossing point of the amplitude modulated optical signal is substantially equal to 50% of a distance from a low to a high level of the amplitude modulated optical signal.

12. A fiber optic transmitter according to claim 1 wherein the optical spectrum reshaper is adapted to have negative slope to increase the crossing point of the amplitude modulated optical signal relative to crossing point of the digital base signal.

13. A fiber optic transmitter according to claim 1 wherein the optical spectrum reshaper is a substantially rounded top Gaussian filter and the crossing point of the amplitude modulated optical signal is reduced by increasing the operating loss point of operation on the substantially rounded top Gaussian filter.

14. A fiber optic transmitter according to claim 1 wherein the crossing point of the amplitude modulated optical signal is adjusted to reduce the bit error rate of the amplitude modulated optical signal at a low optical signal-to-noise ratio.

15. A fiber optic transmitter according to claim 14 wherein the crossing point of the amplitude modulated optical signal is substantially between 20% and 35% of a distance from a low to a high level of the amplitude modulated optical signal.

16. A fiber optic transmitter according to claim 1 wherein the crossing point of the amplitude modulated optical signal is adapted to reduce the distortions in an optical system having a low optical signal-to-noise ratio.

17. A fiber optic transmitter according to claim 1 wherein the crossing point of the digital base signal is adjusted to produce a desired eye opening on the optical output of the transmitter.

18. A fiber optic transmitter according to claim 17 wherein, additionally, the operating point on the optical spectrum reshaper is adjusted to produce a desired eye opening on the optical output of the transmitter.

19. A fiber optic transmitter according to claim 1 wherein the optical spectrum reshaper comprises a Bragg grating filter.

20. A fiber optic transmitter according to claim 19 wherein the Bragg grating filter is formed in a fiber.

21. A fiber optic transmitter according to claim 1 wherein the optical source is a distributed feedback laser.

22. A fiber optic transmitter according to claim 1 wherein the optical source is a distributed Bragg reflector (DBR) laser.

23. A fiber optic transmitter according to claim 22 further comprising a combiner that combines the outputs from a driver and a dc current source, wherein the driver provides a modulated signal and the dc current source provides a dc bias current, and further wherein the combiner combines the modulated signal and the dc bias signal to provide a summed signal.

24. A fiber optic transmitter according to claim 23 wherein the summed signal is provided to the gain section of the laser to produce a frequency modulated optical signal.

25. A fiber optic transmitter according to claim 23 wherein the summed signal is provided to the DBR section of the laser to produce a frequency modulated optical signal.

26. A fiber optic transmitter according to claim 23 wherein the summed signal is provided to the phase section.

27. A fiber optic transmitter according to claim 1 wherein the optical source is a vertical cavity surface emitting laser.

28. A fiber optic transmitter according to claim 1 wherein the optical source is externally modulated.

29. A fiber optic transmitter according to claim 28 wherein the optical source comprises a continuous wave laser and a phase modulator.

30. A fiber optic transmitter according to claim 29 wherein the phase modulator is a semiconductor modulator.

31. A fiber optic transmitter according to claim 29 wherein the phase modulator is a LiNbO3 modulator.

32. A fiber optic transmitter according to claim 1 wherein the optical source is a tunable semiconductor laser.

33. A fiber optic transmitter according to claim 32 wherein the tunable semiconductor laser is a sampled grating distributed Bragg reflector (SGDBR) laser.

34. A fiber optic transmitter according to claim 33, wherein the SGDBR laser includes a sampled grating in a rear section, a gain section, a phase section, and a sampled grating in a front section, and further wherein a summed signal includes a bias current signal and modulated signal that is fed to the gain section to produce the frequency modulated optical signal.

35. A fiber optic transmitter according to claim 19 wherein the Bragg grating filter is formed in a planar waveguide.

36. A fiber optic transmitter according to claim 1 wherein the optical spectrum reshaper is an arrayed waveguide grating.

37. A fiber optic transmitter according to claim 1 wherein the optical spectrum reshaper is a coupled multi-ring resonator filter.

38. A fiber optic transmitter comprising a digital driver adapted to adjust the crossing point of a digital base signal, a directly modulated semiconductor laser adapted to receiver the digital base signal and produce an optical signal, characterized in that:
    the digital driver is configured to maintain a crossing point of the digital base signal offset from a signal level located at 50% of a distance between a high and a low signal level of the digital base signal by an amount effective to reduce the thermal chirp of the optical signal.

39. A method for transmitting a signal, comprising:
    adjusting the crossing point of a digital base signal;
    providing the adjusted signal to an optical source to produce a frequency modulated optical signal; and
    providing the frequency modulated optical signal to an optical spectrum reshaper to convert the frequency modulated optical signal to an amplitude modulated optical signal.

40. The method of claim 39, in which the step of providing the frequency modulated optical signal to an optical spectrum reshaper to convert the frequency modulated optical signal to an amplitude modulated optical signal comprises providing the optical spectrum reshaper with an optical transmission transfer function having a positive slope effective to reduce a crossing point of the amplitude modulated optical signal relative to the crossing point of the digital base signal.

41. The method of claim 39, in which the step of providing the frequency modulated optical signal to an optical spectrum reshaper to convert the frequency modulated optical signal to an amplitude modulated optical signal comprises providing the optical spectrum reshaper with an optical transmission transfer function having a negative slope effective to increase a crossing point of the amplitude modulated optical signal relative to the crossing point of the digital base signal.

42. The method of claim 39, in which the step of providing the frequency modulated optical signal to an optical spectrum reshaper to convert the frequency modulated optical signal to an amplitude modulated optical signal comprises providing the optical spectrum reshaper with a rounded top Gaussian filter effective to reduce the crossing point of the amplitude modulated optical signal by increasing the operating loss point of operation on the substantially rounded top Gaussian filter.

43. The method of claim 39, in which the step of providing the frequency modulated optical signal to an optical spectrum reshaper to convert the frequency modulated optical signal to an amplitude modulated optical signal comprises shifting a crossing point of the amplitude modulated optical signal an amount effective to reduce the bit error rate of the amplitude modulated optical signal.

44. The method of claim 39, in which the step of adjusting the crossing point of the digital base signal comprises maintaining the crossing point of the digital base signal at an offset signal level higher than a middle signal level located between a high and a low level of the digital base signal.

45. The method of claim 44, in which the step of providing the frequency modulated optical signal to an optical spectrum reshaper to convert the frequency modulated optical signal to an amplitude modulated optical signal comprises shifting a crossing point of the amplitude modulated optical signal to be substantially equal to a signal level located at about 50% of a distance between high and low levels of the amplitude modulated optical signal.

46. The method of claim 44, in which the step of providing the frequency modulated optical signal to an optical spectrum reshaper to convert the frequency modulated optical signal to an amplitude modulated optical signal comprises shifting a crossing point of the amplitude modulated optical signal to be a equal to a signal level less than 50% and higher than 20% of a distance from a low level to a high level of the amplitude modulated optical signal.

47. The method of claim 46, in which the step of providing the frequency modulated optical signal to an optical spectrum reshaper to convert the frequency modulated optical signal to an amplitude modulated optical signal comprises shifting a crossing point of the amplitude modulated optical signal to be a equal to a signal level less than 35% and higher than 20% of a distance from a low level to a high level of the amplitude modulated optical signal.

* * * * *